US012617419B2

(12) United States Patent
Brachman et al.

(10) Patent No.: US 12,617,419 B2
(45) Date of Patent: May 5, 2026

(54) GUIDING A USER TO INTERACT WITH AN INTELLIGENT COMPUTING SYSTEM USING BEST PRACTICES

(71) Applicant: INTERNATIONAL BUSINESS MACHINES CORPORATION, Armonk, NY (US)

(72) Inventors: Michelle Brachman, Quincy, MA (US); Zahra Ashktorab, Brooklyn, NY (US); Michael Desmond, White Plains, NY (US); Hyo Jin Do, Cambridge, MA (US); Casey Dugan, Cambridge, MA (US); James Johnson, Somerville, MA (US); Qian Pan, Canton, MA (US); Raj Sanjay Shah, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 18/542,554

(22) Filed: Dec. 15, 2023

(65) Prior Publication Data
US 2025/0196874 A1 Jun. 19, 2025

(51) Int. Cl.
*B60W 50/14* (2020.01)
*B60K 35/80* (2024.01)

(52) U.S. Cl.
CPC .............. *B60W 50/14* (2013.01); *B60K 35/80* (2024.01); *B60K 2360/11* (2024.01); *B60W 2050/146* (2013.01)

(58) Field of Classification Search
CPC . B60W 50/14; B60W 2050/146; B60K 35/80; B60K 2360/11; G08G 1/00; B60Q 9/00
(Continued)

(56) References Cited

U.S. PATENT DOCUMENTS 9,727,326 B2 8/2017 Ciudad et al.
9,751,534 B2 * 9/2017 Fung .................... G06V 10/764
(Continued)

FOREIGN PATENT DOCUMENTS

CN 116483977 A 7/2023
CN 116483980 A 7/2023
(Continued)

OTHER PUBLICATIONS

Boggust et al., "Saliency Cards: A Framework to Characterize and Compare Saliency Methods", arXiv:2206.02958v2 [cs.LG], May 30, 2023, 19 pages.
(Continued)

*Primary Examiner* — Tuan C To
(74) *Attorney, Agent, or Firm* — Harrity & Harrity, LLP

(57) ABSTRACT
A plurality of best practice rules pertaining to best practices for interacting with a system can be received. A first user interaction from a user can received. A best practice determiner can determine whether the first user interaction fits at least one of the best practice rules. Responsive to determining, by the best practice determiner, that the first user interaction does not fit the at least one of the best practice rules, a modified user interaction can be generated by modifying the first user interaction based, at least in part, on the received plurality of best practice rules. The modified user interaction can be presented to the user.

20 Claims, 8 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 11,074,054 | B1 * | 7/2021 | Weibel | G06N 20/00 |
| 2020/0285676 | A1 | 9/2020 | Lawson et al. | |
| 2021/0232373 | A1 * | 7/2021 | Weibel | G06N 20/00 |
| 2022/0219691 | A1 * | 7/2022 | Maleki | G06F 11/0754 |
| 2024/0278770 | A1 * | 8/2024 | Zhao | B60W 30/18172 |
| 2024/0278831 | A1 * | 8/2024 | Matsumoto | B62D 15/025 |

FOREIGN PATENT DOCUMENTS

| | | | | |
|---|---|---|---|---|
| CN | 116525068 | A | 8/2023 | |
| CN | 116595611 | A | 8/2023 | |
| CN | 116645243 | A | 8/2023 | |
| EP | 1612703 | A1 * | 1/2006 | G06F 16/213 |
| EP | 3730332 | A1 * | 10/2020 | G06V 20/597 |
| EP | 4130992 | A1 * | 2/2023 | G06F 3/04847 |
| JP | 2019-220110 | A | 12/2019 | |
| KR | 10-2249623 | B1 | 5/2021 | |

OTHER PUBLICATIONS

Brachman et al., "Follow the Successful Herd: Towards Explanations for Improved Use and Mental Models of Natural Language Systems", IUI '23: Proceedings of the 28th International Conference on Intelligent User Interfaces, Mar. 27, 2023, pp. 220-239.

Cabra-Acela et al., "On Using Information Retrieval to Recommend Machine Learning Good Practices for Software Engineers", arXiv:2308.12095v2 [cs.SE], Aug. 25, 2023, 5 pages.

Chadha et al., "GPT-NeoXT-Chat-Base-20B foundation model for chatbot applications is now available on Amazon SageMaker", https://aws.amazon.com/blogs/machine-learning/gpt-neoxt-chat-base-20b-foundation-model-for-chatbot-applications-is-now-available-on-amazon-sagemaker/, May 16, 2023, 9 pages.

Cortés-Coy et al., "On Automatically Generating Commit Messages via Summarization of Source Code Changes", SCAM '14: Proceedings of the 2014 IEEE 14th International Working Conference on Source Code Analysis and Manipulation, Sep. 28, 2014, pp. 275-284.

Gero et al., "Mental Models of AI Agents in a Cooperative Game Setting", CHI '20: Proceedings of the 2020 CHI Conference on Human Factors in Computing Systems, Apr. 23, 2020, 12 pages.

Hodhod et al., "Closing the Cognitive Gap between Humans and Interactive Narrative Agents Using Shared Mental Models", IUI '16: Proceedings of the 21st International Conference on Intelligent User Interfaces, Mar. 7, 2016, pp. 135-146.

Jacovi et al., "Contrastive Explanations for Model Interpretability", arXiv:2103.01378v3 [cs.CL], Sep. 14, 2021, 15 pages.

Jeremy J Webb, "Proof of Concept: Using ChatGPT to Teach Emergency Physicians How to Break Bad News", Cureus, https://pubmed.ncbi.nlm.nih.gov/37303324/, May 9, 2023, 6 pages.

Lanciano et al., "Analyzing Declarative Deployment Code with Large Language Models", 13th International Conference on Cloud Computing and Services Science, Jan. 2023, 8 pages.

Liang et al., "Holistic Evaluation of Language Models", arXiv:2211.09110v2 [cs.CL], Oct. 1, 2023, 162 pages.

Liu et al., "ATOM: Commit Message Generation Based on Abstract Syntax Tree and Hybrid Ranking", arXiv:1912.02972v2 [cs.SE], Nov. 11, 2020, 17 pages.

No Author, "Deploy FLAN-UL2 20B on Amazon SageMaker", https://www.philschmid.de/deploy-flan-ul2-sagemaker, Mar. 20, 2023, 8 pages.

No Author, "Introduction: Use natural language to explore data with Power Bi Q&A", https://web.archive.org/web/20240107142006/https://learn.microsoft.com/en-us/power-bi/natural-language/q-and-a-intro, Sep. 30, 2023, 6 pages.

No Author, "Make Alexa Calls with Your Voice", https://web.archive.org/web/20200317190644/https://www.amazon.com/gp/help/customer/display.html?nodeId=GEC6XC297YU93LDA, Mar. 17, 2020, 2 pages.

Wang et al., "Watch Out for Updates: Understanding the Effects of Model Explanation Updates in AI-Assisted Decision Making", CHI '23: Proceedings of the 2023 CHI Conference on Human Factors in Computing Systems, Apr. 19, 2023, 19 pages.

Weisz et al., "BigBlueBot: Teaching Strategies for Successful Human-Agent Interactions", IUI '19: Proceedings of the 24th International Conference on Intelligent User Interfaces, Mar. 17, 2019, pp. 448-459.

Weisz et al., "Perfection Not Required? Human-AI Partnerships in Code Translation", arXiv:2104.03820v1 [cs.HC], Apr. 8, 2021, 18 pages.

* cited by examiner

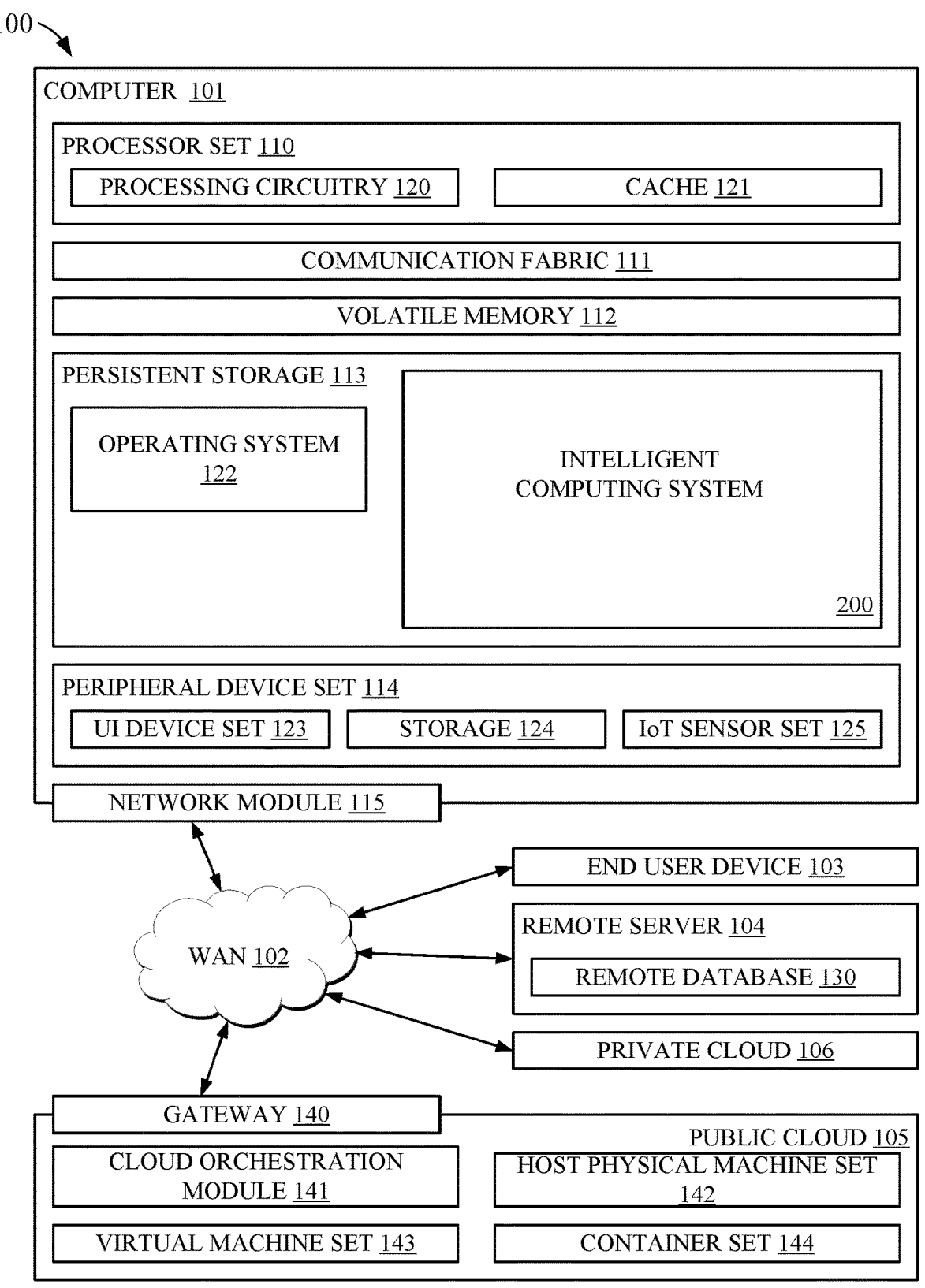

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

INTELLIGENT COMPUTING SYSTEM

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143    CONTAINER SET 144

Hello! I am your code assistant. How can I help you?

Kubernetes 5.0

I noticed your response seemed more like a search input. This chat works better if you provide more information about what you need.

I provided a modified input below to show you what I mean.

How can I get started with Kubernetes 5.0?

218

700

702

Hello! I am your code assistant. How can I help you?

Kubernetes 5.0

1000

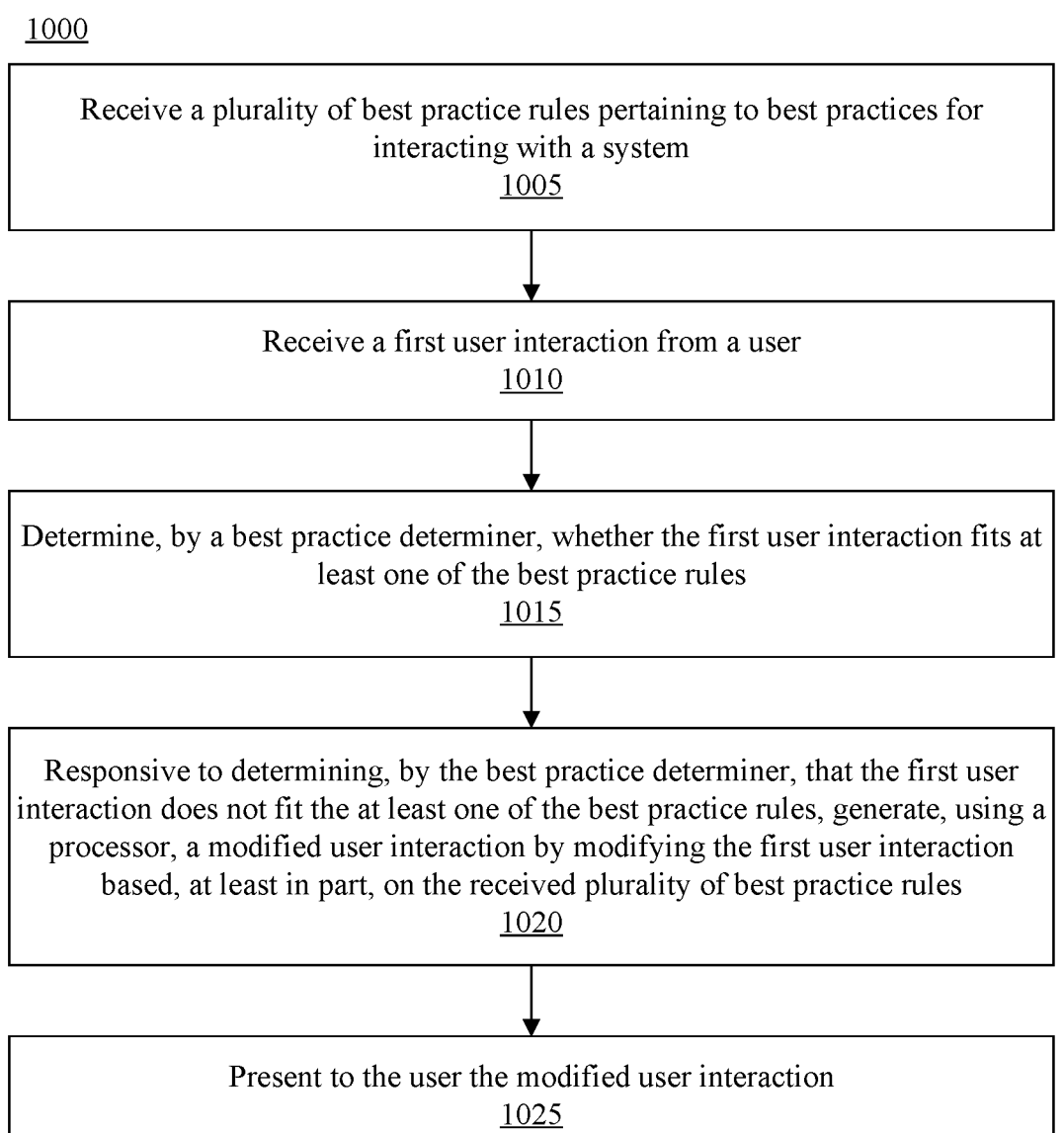

Receive a plurality of best practice rules pertaining to best practices for interacting with a system
1005

Receive a first user interaction from a user
1010

Determine, by a best practice determiner, whether the first user interaction fits at least one of the best practice rules
1015

Responsive to determining, by the best practice determiner, that the first user interaction does not fit the at least one of the best practice rules, generate, using a processor, a modified user interaction by modifying the first user interaction based, at least in part, on the received plurality of best practice rules
1020

Present to the user the modified user interaction
1025

FIG. 10

GUIDING A USER TO INTERACT WITH AN INTELLIGENT COMPUTING SYSTEM USING BEST PRACTICES

BACKGROUND

The present invention relates to data processing systems, and more specifically, to intelligent computing systems.

An intelligent computing system is an advanced computer system that can gather, analyze and respond to data it collects. An intelligent computing system gains artificial intelligence by training on large amounts of training data using a variety of computational models, and uses the artificial intelligence to interpret and reason about gathered data. Rather than following a set of fixed rules, an intelligent computing system can learn hidden structures in data, extract useful patterns, and learn strategies and actions.

SUMMARY

A method includes receiving a plurality of best practice rules pertaining to best practices for interacting with a system. The method also can include receiving a first user interaction from a user. The method also can include determining, by a best practice determiner, whether the first user interaction fits at least one of the best practice rules. The method also can include, responsive to determining, by the best practice determiner, that the first user interaction does not fit the at least one of the best practice rules, generating, using a processor, a modified user interaction by modifying the first user interaction based, at least in part, on the received plurality of best practice rules. The method also can include presenting to the user the modified user interaction.

A system includes a processor programmed to initiate executable operations implementing the method.

A computer program product includes a computer readable storage medium having program code stored thereon. The program code is executable by a data processing system to initiate operations implementing the method.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 depicts a cloud computing environment according to an embodiment of the present invention.

FIG. 10 is a flowchart illustrating an example of a method of guiding a user to interact with an intelligent computing system using best practices.

DETAILED DESCRIPTION

Figure 2:
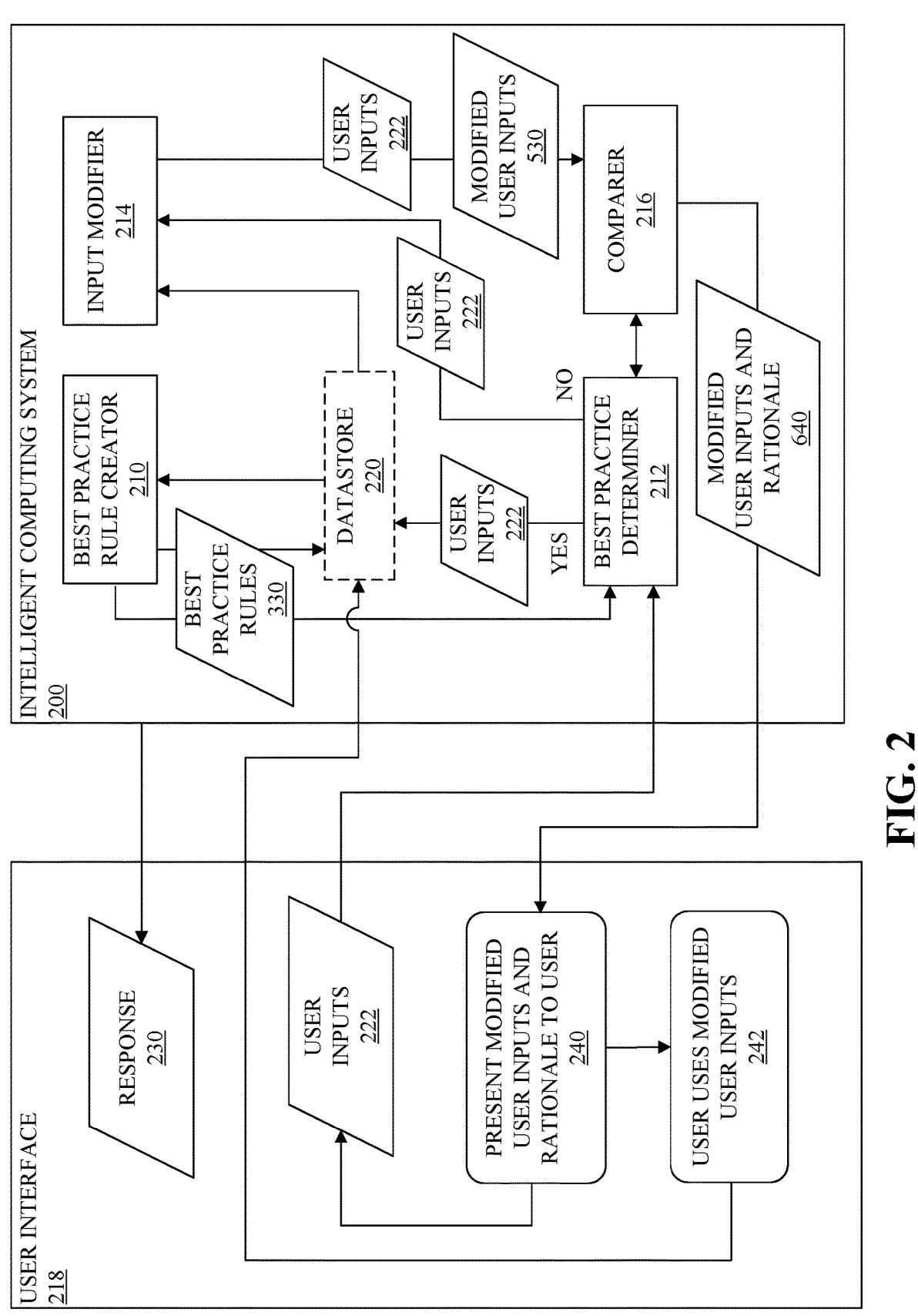
FIG. 2 is a block diagram illustrating example architecture for an intelligent computing system.

This disclosure relates to data processing systems, and more specifically, to intelligent computing systems.

The arrangements described herein are directed to computer technology, and provide an improvement to computer technology. Specifically, the present arrangements improve the efficiency of intelligent computing systems to respond to user inputs. Oftentimes user inputs to an intelligent computing system do not fit best practices for interfacing with the intelligent computing system. For example, user inputs may be nebulous. When the intelligent computing system attempts to process such user inputs, computing resources (e.g., processor and memory resources) are tied up attempting to determine an appropriate response to an unclear, vague or ill-defined request. This process can iterate, tying up computing resources even more, when subsequent user inputs are received that still do not fit best practices for the intelligent computing system. The arrangements described herein address this issue by guiding users to interact with intelligent computing systems using best practices. For instance, a modified user input, which conforms to the best practices for the intelligent computing system, can be presented to a user. The user may consider submitting the modified user input a next user input. Accordingly, the next user input likely will fit best practices, thereby enabling the intelligent computing system to efficiently generate an appropriate response, thereby reducing usage of the computing resources.

The present arrangements also improve safety. In this regard, intelligent computing systems can be used in vehicles in conjunction with various control mechanisms/systems. Sometimes user inputs, for example steering inputs, can result in dangerous actions, such as departing a lane while adaptive cruise control is enabled. The present arrangements can detect such dangerous actions, and prompt a user to take corrective action. Accordingly, the present arrangements can reduce the potential for vehicle accidents.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved intelligent computing system (hereinafter "intelligent computing system") 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a block diagram illustrating example architecture for intelligent computing system 200. Intelligent computing system 200 can include a best practice rule creator 210, a best practice determiner 212, an input modifier 214, a comparer 216 and a user interface 218. Intelligent computing system 200 can store data to, and retrieve data from a datastore 220. Datastore 220 can include, for example, volatile memory 112, persistent storage 113, storage 124, remote database 130, a network attached storage, and/or the like.

A user can interface with intelligent computing system 200 via user interface 218. User interface 218 can be presented by a component of a device or system hosting intelligent computing system 200, or can be communicated from intelligent computing system 200 to, and presented by, a client device communicatively linked to intelligent computing system 200, e.g., via WAN 102 and/or LAN. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, an in-vehicle infotainment system, a smart vehicle system, and the like. User interface 218 can be configured to present information to users, for example via text, images, video and/or audio (e.g., spoken utterances), and to receive one or more user inputs 222 interacting with intelligent computing system 200. User interface 218 can communicate the one or more user inputs 222 to intelligent computing system 200, which can store user inputs 222 to datastore 220. User interface 218 can receive, as user inputs 222, user interactions with intelligent computing system 200. Examples of user interactions include, but are not limited to, text input by users, utterances spoken by users, user gestures, user actions controlling of mechanisms/systems, etc. In arrangements in which spoken utterances are received from the user, user interface 218 can include a speech recognition module that converts the spoken utterances to text and communicates the resulting text as user inputs 222. Hereinafter the terms "user input" and "user interaction" may be used interchangeably.

Figure 3:
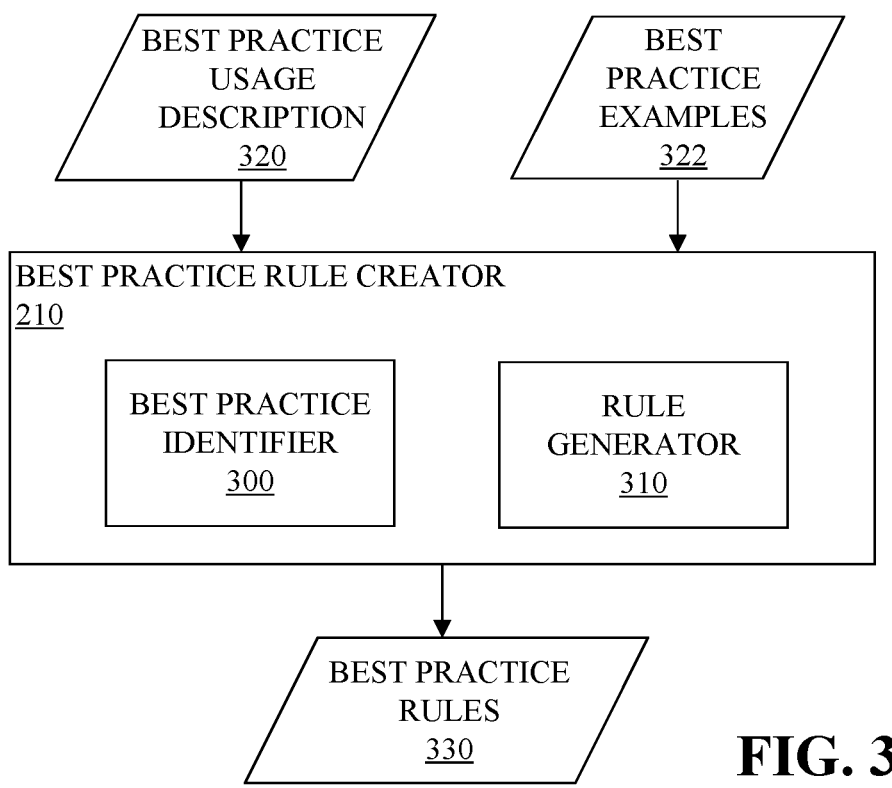
FIG. 3 is a block diagram illustrating example architecture for a best practice rule creator.

FIG. 3 is a block diagram illustrating example architecture for best practice rule creator 210. Best practice rule creator 210 can include a best practice identifier 300 and a rule generator 310. Best practice identifier 300 be configured to receive, as input, best practice descriptions 320, and best practice examples 322 of correct interactions. In illustration, best practice identifier 300 can receive best practice descriptions 320 and best practice examples 322 of correct interactions from product and/or service documentation, which can be stored in datastore 220. Best practice identifier 300 can analyze best practice descriptions 320 in context with the best practice examples 322 of correct interactions and, based on such analysis, determine qualities of the examples pertinent to best practices. In one or more arrangements, the determined qualities can be general in nature. Examples of determined qualities include, but are not limited to, particular structures of natural language user interactions and content that should be included in a user interaction. Other examples, for instance for graphical user interface or mechanical device interactions, include, but are not limited to, sequences of actions performed in a particular order, a particular way and/or under particular conditions.

Based on the determined qualities, rule generator 310 can generate at least one set of best practice rules 330 that describe best practices, and best practice rule creator 210 can output the set of best practice rules 330. In illustration, best practice rule creator 210 can output the set of best practice rules 330 to datastore 220. In one or more arrangements, best practice rule creator 210 also can output the set of best practice rules 330 to best practice determiner 212, to input modifier 214 and/or to comparer 216, though the present arrangements are not limited in this regard. For example, best practice determiner 212, input modifier 214 and/or comparer 216 can access best practice rules from datastore 220. In one or more arrangements, the best practice rules 330 can include, for example, natural language descriptions of best practices. In one or more arrangements, the best practice rules 330 can include, for example, code functions that validate user inputs 222 based on whether the user inputs 222 match best practices.

Figure 4:
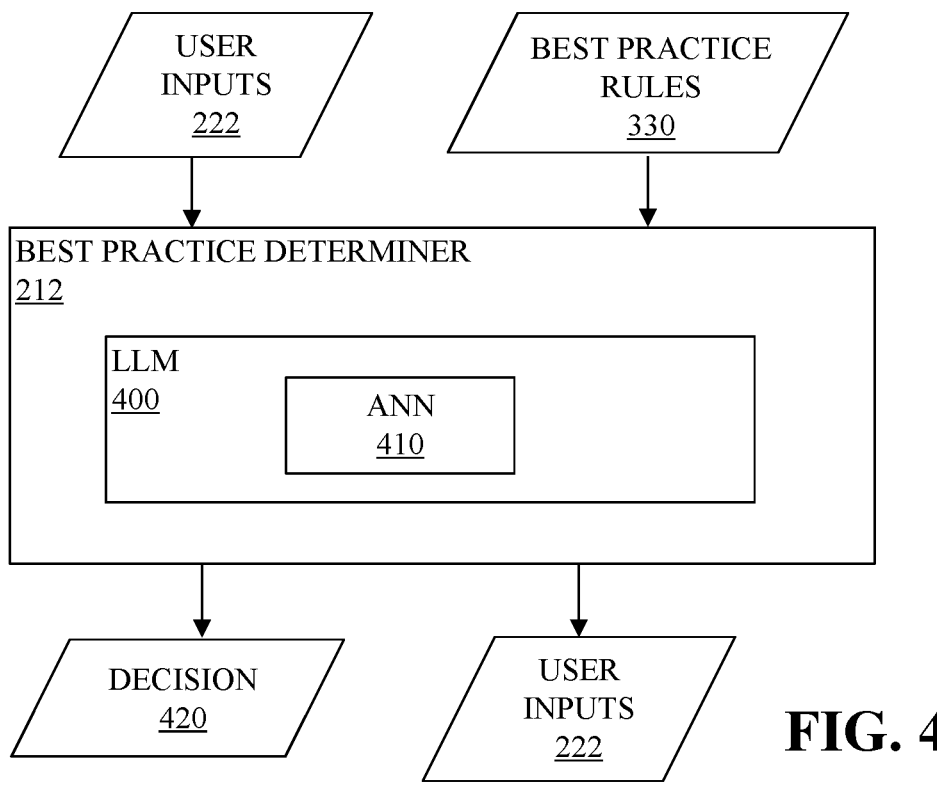
FIG. 4 is a block diagram illustrating example architecture for a best practice determiner.

FIG. 4 is a block diagram illustrating example architecture for best practice determiner 212. Best practice determiner 212 can include a large language model 400. Large language model 400 can be configured to determine whether a user input best fits use practices for intelligent computing system 200. Large language model (LLM) 400 can include an artificial neural network (ANN) 410 implementing a deep learning algorithm configured to perform a variety of natural language processing (NLP) tasks. LLM 400 can use a transformer model architecture. The transformer model architecture can include an encoder and a decoder, and can process data by tokenizing input data, and implementing algorithms to discover relationships between tokens, thus enabling pattern recognition. Best practice determiner 212 can be trained using one or more massive datasets, enabling best practice determiner 212 to recognize, translate, predict and/or generate text and/or other content.

Best practice determiner 212 can receive user inputs 222 (i.e., user interactions) and best practice rules 330. Large language model 400 can evaluate the user inputs 222 against each best practice rule 330 and determine whether each user input 222 fits a best practice rule 330. For each user input 222, best practice determiner 212 can output a decision 420 indicating whether the user input 222 fits a best practice rule 330. The decision 420 can be, for example, a binary value. If the user input 222 fits a best practice rule 330, best practice determiner 212 can store user input 222 to datastore 220, for example as a sample user interaction comprising training data. Accordingly, user input can be used as training data to train LLM 400 and/or train other LLMs. If the user input 222 does not fit a best practice rule 330, best practice determiner 212 can communicate the user input 222 to input modifier 214.

Figure 5:
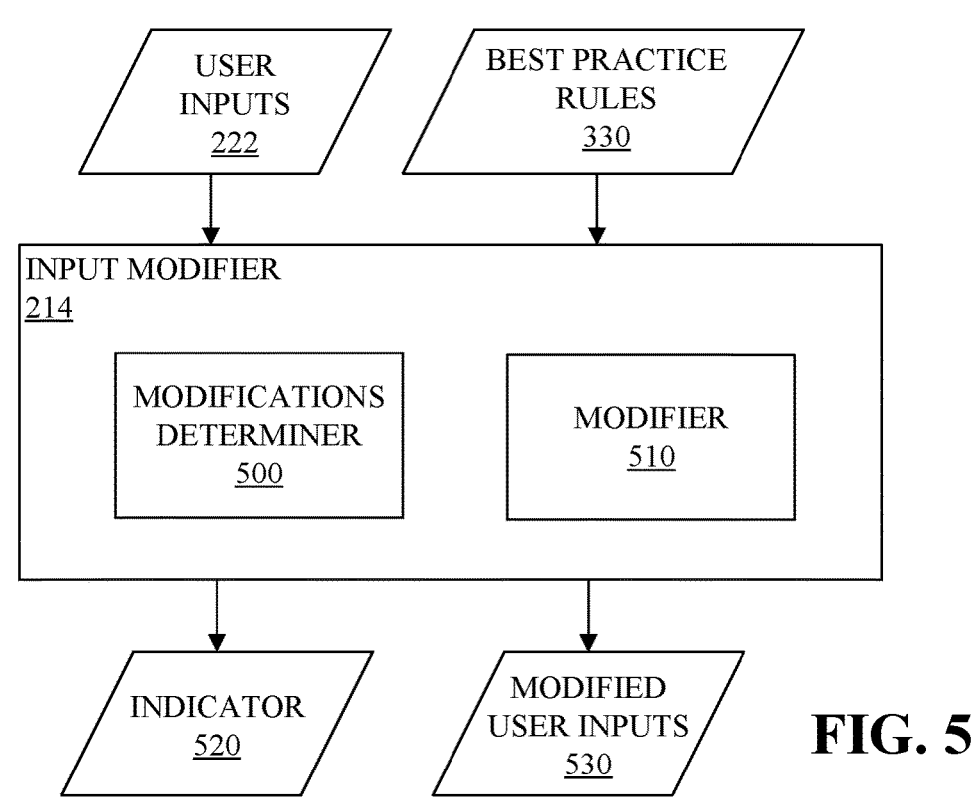
FIG. 5 is a block diagram illustrating example architecture for an input modifier.

FIG. 5 is a block diagram illustrating example architecture for input modifier 214. Input modifier 214 can include a modifications determiner 500 and a modifier 510. Modifications determiner 500 can, for each best practice rule 330, determine whether the user interaction with intelligent computing system 200, i.e., the user input 222, fits the best practice rule 330. If the user input 222 fits at least one best practice rule 330, input modifier 214 can output an indicator 520 indicating the user input 222 fits a best practice rule 330. If, however, the user input 222 does not fit at least one best practice rule 330, modifier 510 can generate a modified user input 530, which can be a version of the user input 222 based on best practice for intelligent computing system 200. Modifier can communicate modified user input 530 to comparer 216 and/or store modified user input 530 to datastore 220.

In illustration, to generate modified user input 530, modifier 510 can utilize natural language processing (NLP) to modify the user input 222 to conform to a best practice for interacting with intelligent computing system 200. The NLP can include, for instance, using a model to generate modified user input 530 and/or using a template that fits the style of intelligent computing system 200 based on best practice rules 330. In some instances, the NLP can replace certain words in the user input 222 with key words used by intelligent computing system 200. In another example, to generate modified user input 530, modifier 510 can generate an image or code for a graphical user interface interaction with the user.

Figure 6:
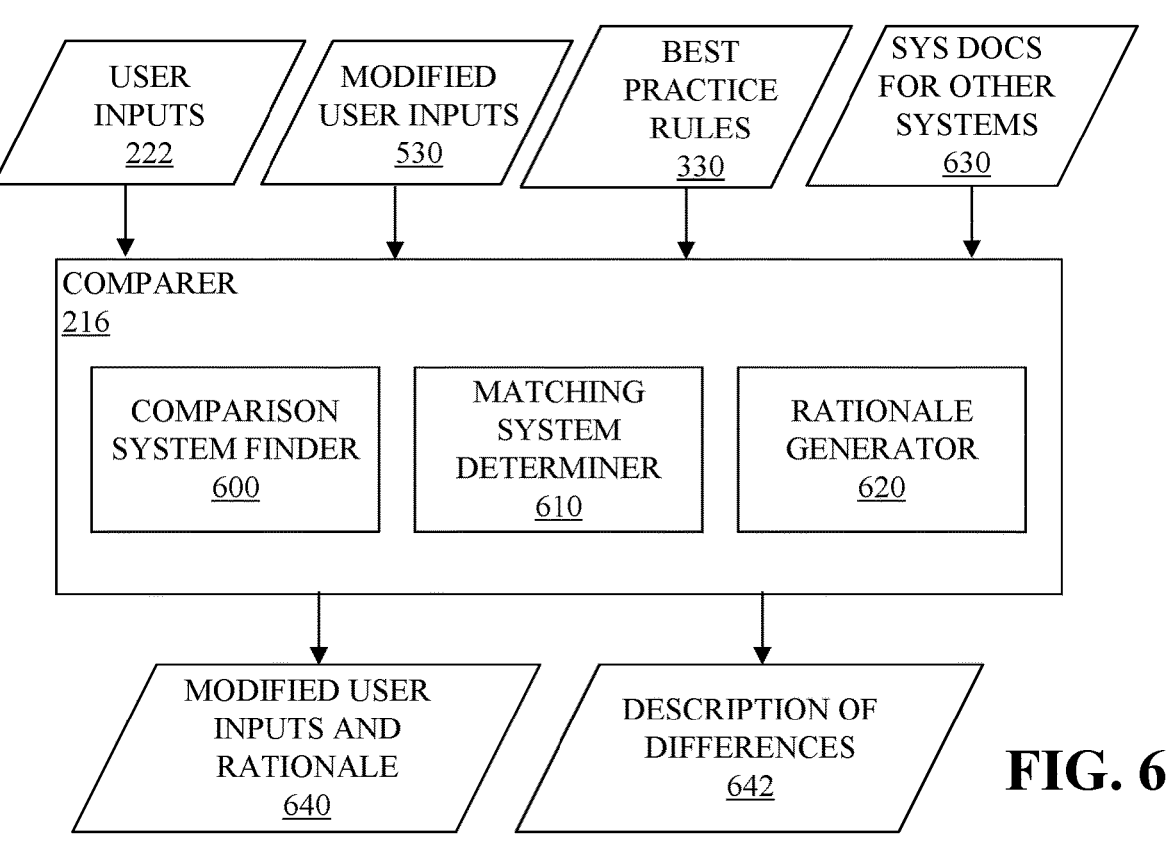
FIG. 6 is a block diagram illustrating example architecture for a comparer.

FIG. 6 is a block diagram illustrating example architecture for comparer 216. Comparer 216 can include a comparison system finder 600, a matching system determiner 610 and a rationale generator 620. Comparison system finder 600 can search for and identify other systems that are similar to intelligent computing system 200. Comparison system finder 600 can include, for example, a search application programming interface (API) configured to search for and identify the other systems that are similar to intelligent computing system 200. In another example, comparison system finder 600 can be configured to search a database of other systems and identify the other systems that are similar to intelligent computing system 200. Such database can be hosted on datastore 220 or hosted on another storage device.

Matching system determiner 610 can determine best practices for the other systems that are identified. For example, matching system determiner 610 can identify system documentation 630, which can include user input examples, for the other systems. The other systems can be, for instance, other systems having user interfaces similar to user interface 218. Matching system determiner 610 can interface with best practice determiner 212 which, at the behest of matching system determiner 610, can determine the best practices for the other systems, for example by analyzing system documentation 630 for the other systems.

Matching system determiner 610 can determine whether the best practices for the other systems fit user inputs 222 by comparing user inputs 222 to the best practices for the other systems. Responsive to determining that the best practices for the other systems fit user inputs 222, rationale generator 620 can generate rationale explaining why the best practices for the other systems fit user inputs 222. The rationale can be generated based on comparing user inputs 222 to the best practices for the other systems, and/or based on comparing the best practices for the other systems to best practice rules 330. Rationale generator 620 can perform the comparisons using NLP or deterministic code. Comparer 216 can output modified user inputs 530 and the rationale as modified user inputs and rationale 640.

In one or more arrangements, rationale generator 620 can generate a description of the differences between user inputs 222 and the best practice rules for the other systems, differences between modified user inputs 530 and best practice rules for other systems, differences between user inputs 222 and best practice rules 330, and/or differences between modified user inputs 530 and best practice rules 330. Rationale generator 620 can determine the differences, for example, using generative artificial intelligence and/or using a template. Comparer 216 can output the description of differences 642 to best practice descriptions 320 of best practices for intelligent computing system 200. Best practice descriptions 320 can be stored in, for example, datastore 220.

Referring again to FIG. 2, in operation best practice rule creator 210 can generate best practice rules 330, for example as previously described. Best practice rule creator 210 can store best practice rules 330 to datastore 220. Best practice rule creator 210 also can communicate best practice rules 330 to best practice determiner 212 upon request by best practice determiner 212.

Best practice determiner 212 can receive a user input 222, for example as a user interaction with intelligent computing system 200, via user interface 218. The user can generate user input 222 using text, one or more spoken utterances, one or more menu selections, etc., and submit user input 222 to intelligent computing system 200. Responsive to receiving user input 222, best practice determiner 212 can, in real time, access best practice rules 330 from datastore 220 or by communicating a request for the best practice rules 330 to best practice rule creator 210. Using best practice rules 330, best practice determiner 212 can process user input 222 and, based on such processing, determine whether the user interaction fits a best practice for interacting with intelligent computing system 200, for example as previously described. If the user interaction (i.e., user input 222) fits a best practice for interacting with intelligent computing system 200, best practice determiner 212 can store user input 222 to datastore 220 as an example user input, and intelligent computing system can process user input 222 to determine a response 230 to user input 222. In illustration, intelligent computing system 200 can query a database, which can be hosted by datastore 220, using user input. Intelligent computing system 200 can determine results of that query to be response 230. Intelligent computing system 200 can present response 230 to the user via user interface 218.

If the user interaction (i.e., user input 222) does not fit a best practice for interacting with intelligent computing system 200, best practice determiner 212 can, in real time, communicate user input 222 to input modifier 214. Input modifier 214 can, in real time, modify user input 222, for example as previously described, to generate modified user input 530. Input modifier 214 can communicate user input 222 and modified user input 530 to comparer 216. Comparer 216 can, in real time, compare user input 222 with best practices for other systems and, based on the comparison, generate rationale, for example as previously described. Comparer 216 can communicate modified user input and rationale 640 to user interface 218. Further, comparer 216 can, in real time, generate a description of differences 642 between user inputs 222 and the best practice rules for the other systems and/or differences between modified user inputs 530 and user inputs 222. Comparer 216 can output the description of differences 642 to best practice descriptions 320.

At step 240 intelligent computing system 200 can present modified user input and rationale 640 to the user via user interface 218. At step 242, the user may choose to submit modified user input 530 to intelligent computing system 200. If so, the user can interact with user interface 218 to submit modified user input 530 to intelligent computing system as a next user input 222. If, however, the user chooses not to use modified user input 530, the user can revise modified user input 530 and submit the revision as a next user input 222, or the user can generate a new user interaction as a next user input 222. The user can submit next user input 222 using a spoken utterance, selecting a menu item or icon, or submit next user input 222 to intelligent computing system 200 in any other suitable manner. In response, intelligent computing system 200 can iterate processing of next user input 222 until intelligent computing system 200 presents response 230 to the user via user interface 218.

Figures 7A, 7B:
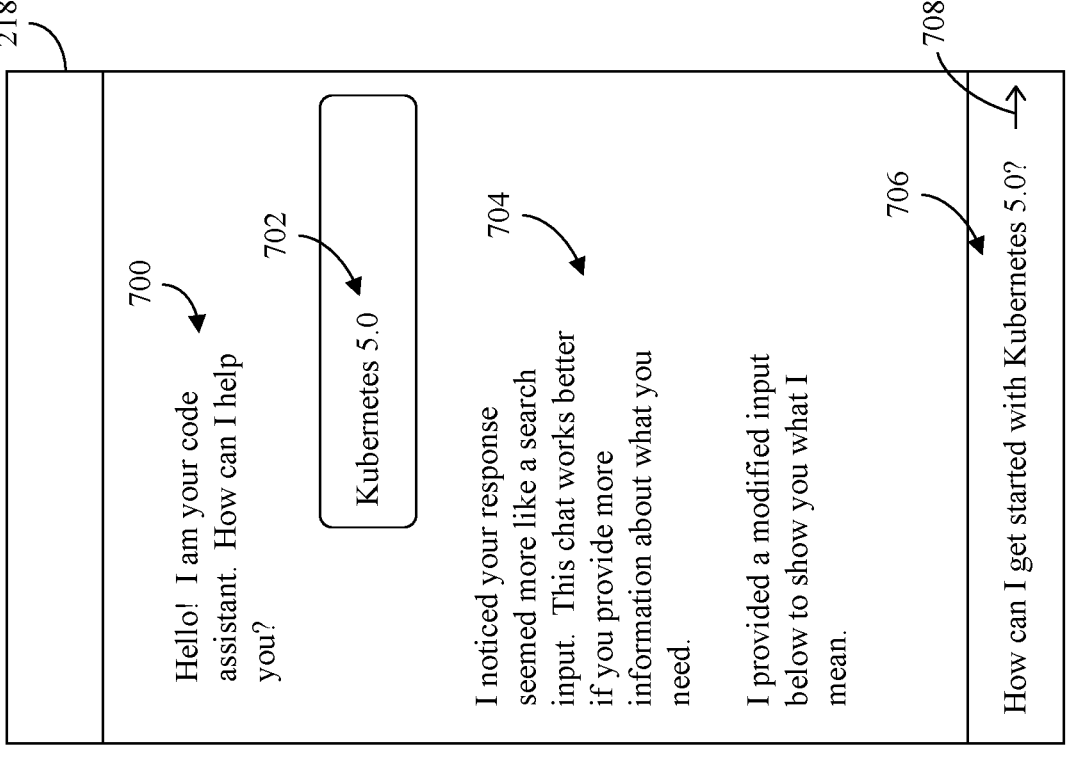
FIGS. 7A and 7B depict an example of a user interface of an intelligent computing system.

FIGS. 7A and 7B depict an example of user interface 218 of intelligent computing system 200. In this example a user can interact with intelligent computing system 200 using text. The present arrangements are not limited in this regard, however. For example, user interface 218 can provide prompts to the user using spoken utterances generated using speech syntheses (e.g., text-to-speech), and the user can provide user inputs 222 as spoken utterances. User interface can convert the spoken utterances to text using speech recognition.

Referring to FIG. 7A, via user interface 218, intelligent computing system 200 can generate a prompt 700 prompting the user to enter a user input 702 to interact with intelligent computing system 200. Best practice determiner 212 (FIG. 2) can receive user input 702. Best practice determiner 212 can determine, in real time based on best practice rules 330, whether user input 702 fits a best practice for interacting with intelligent computing system 200, for example as previously described. If not, referring to FIG. 7B, via user interface 218 intelligent computing system 200 can generate a notification 704 indicating to the user that a different user input would be beneficial to clarify use with intelligent computing system 200, as well as rationale for such, and indicating to the user a modified user input 706 the user may choose to use. The user can choose to use the modified user input 706 as a next user interaction, for example by selecting an icon 708.

Figure 8:
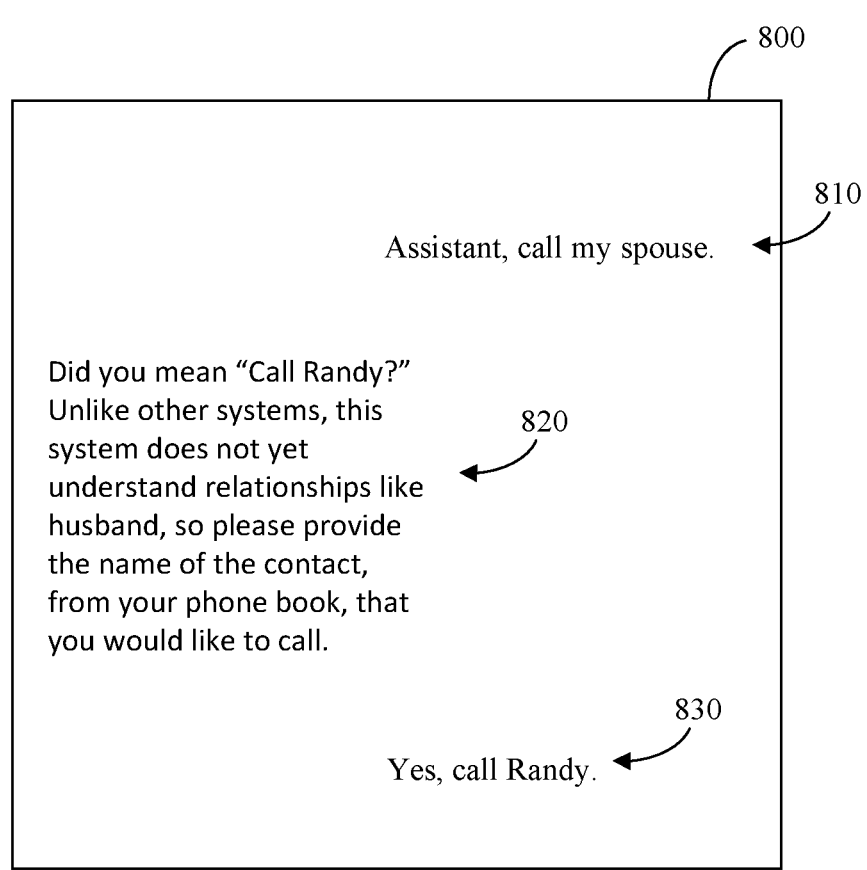
FIG. 8 depicts an example of a conversation between a user and an intelligent computing system using spoken utterances.

FIG. 8 depicts an example of a conversation 800 between a user and intelligent computing system 200 using spoken utterances. In this example intelligent computing system 200 can be a home automation system, for example a smart home assistant. A user can interact with intelligent computing system 200 by providing a user input 810, for example requesting that intelligent computing system 200 call her spouse. If intelligent computing system 200 does not have a user profile for the user indicating who is the user's spouse, then best practice determiner 212 (FIG. 2) can determine that user input 810 does not fit best practice for interacting with intelligent computing system 200. Accordingly, input modifier 214 can, in real time, modify user input 810 to generate a modified user input, for example "Call Randy." Comparer 216 can, in real time, generate rationale and communicate the modified user input and rationale 820 to the user. In this example, the modified user input can be integrated in the rationale as a question "Did you mean 'Call Randy?'," as well as provide additional information for the rationale, for instance, "Unlike other systems, this system does not yet understand relationships like spouse, so please provide the name of the contact, from your phone book, that you would like to call." In response, the user can provide a next input 830 according to the modified user input, for instance, "Yes, call Randy." Responsive to receiving the next user input 830, best practice determiner 212 can determine that the next user input 830 fits best practice for interacting with intelligent computing system 200, and intelligent computing system 200 can place the call to the indicated recipient.

Figure 9:
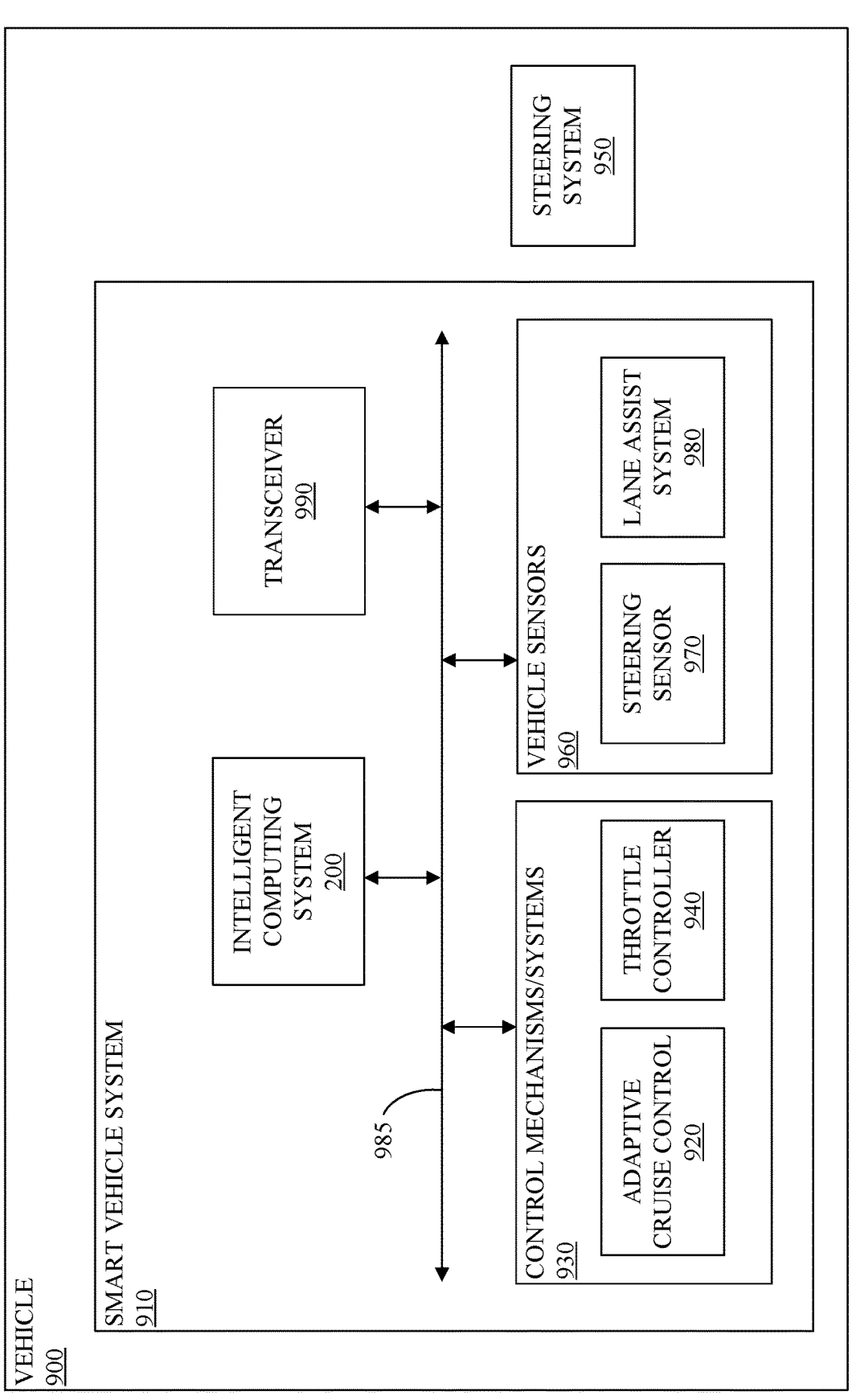
FIG. 9 is a block diagram illustrating an example of an intelligent computing system integrated into a smart vehicle system.

FIG. 9 is a block diagram illustrating an example of intelligent computing system 200 integrated into a smart vehicle system 910 in a vehicle 900. In this example smart vehicle system 910 includes adaptive cruise control 920, but does not provide lane assist (not shown) to automatically control steering of vehicle 900 to keep the vehicle 900 in a proper driving lane.

Smart vehicle system 910 can include a plurality of control mechanisms/systems 930, which can include, among other things, adaptive cruise control 920 and a throttle controller 940. In this example, vehicle 900 can include a steering system 950, including a steering wheel that is not controlled by smart vehicle system 910. Nonetheless, smart vehicle system 910 can include a plurality of vehicle sensors 960, including a steering sensor 970 that detects steering inputs (e.g., steering angle) and outputs data indicating the steering inputs, and a lane assist system 980 configured to detect lane departure using one or more cameras and output data indicating lane departure. Intelligent computing system 200, control mechanisms/systems 930 and vehicle sensors 960 can be communicatively linked via a vehicle bus 985, for example a controller area network (CAN) bus.

In operation, user interaction with steering system 950, for example user control of the steering system changing a steering angle, can be detected by steering sensor 970 as a user input 222 (FIG. 2). In this regard, steering system 950 and steering sensor 970 can be considered components of user interface 218. Responsive to detecting the user input 222, best practice determiner 212 can determine whether adaptive cruise control 920 is enabled while the user interaction with steering system 950 is detected. Responsive to determining, by best practice determiner 212, that adaptive cruise control 920 is enabled while the user interaction with steering system 950 is detected, best practice determiner 212 can determine, in real time based on best practice rules 330 pertaining to use of adaptive cruise control 920, that best practice during use of adaptive cruise control is for the user to keep control of steering system 950 and for vehicle 900 not to drift into other lanes. In this example, best practice determiner 212 also can receive lane departure data from lane assist system 980 indicating whether vehicle 900 is drifting into another lane.

If, based on user input 222 and lane departure data, best practice determiner 212 determines that user input 222 indicates a changing steering angle and vehicle 900 is drifting into another lane, best practice determiner 212 can determine that user input 222 does not fit best practices. Accordingly, input modifier can generate modified user input 530 including a suggestion pertaining to safe operation of the vehicle. In this example, modified user input 530 can be a suggested user interaction, for example "Warning! Continue to monitor your position in the lane." Comparer 216 (e.g., rationale generator 620) can generate rationale for modified user input 530, for example "this car does not have lane assist, unlike many other models with intelligent cruise control." User interface 218 can present to the user modified user input and rationale 640, for example "Warning! Continue to monitor your position in the lane, as this car does not have lane assist, unlike many other models with intelligent cruise control." In this example, an infotainment system of vehicle 900 also can be considered a component of user interface 218.

Referring to FIGS. 6 and 9, to generate the rationale, matching system determiner 610 can interface with best practice determiner 212 which, at the behest of matching system determiner 610, can determine the best practices for the other smart vehicle systems that include lane assist systems. Best practice determiner 212 can access the best practices for the other smart vehicles by communicating a request, via vehicle bus 985 and a transceiver 990 of vehicle 900, to another system that stores best practices for the other smart vehicles. Responsive to such request, the other system can communicate to best practice determiner 212 the best practices for the other smart vehicles.

In one or more arrangements, if the best practices for the other smart vehicles is not available, best practice determiner 212 can access system documentation 630 for the other smart vehicles by communicating a request, via vehicle bus 985 and a transceiver 990 of vehicle 900, to another system that stores the system documentation 630. Responsive to such request, the other system can communicate to best practice determiner 212 the system documentation 630 for the other smart vehicles. Best practice determiner 212 can determine best practices for the other smart vehicles by analyzing the system documentation 630 for the other smart vehicles.

With regard to accessing the best practices or system documentation for the other smart vehicle systems, smart vehicle system 910 can include one or more modules configured to wirelessly communicate via a transceiver 990, and provide to intelligent computing system 200 access to such modules.

Rationale generator 620 can generate rationale explaining why the best practices for the other vehicle systems fit user input 222. Further, where user input 222 differs from the best practices for the other smart vehicle systems, rationale generator can generate description of differences 642. Comparer 216 can output description of differences 642 to best practice descriptions 320 (FIG. 3).

FIG. 10 is a flowchart illustrating an example of a method 1000 of guiding a user to interact with an intelligent computing system using best practices. Method can be implemented by intelligent computing system 200.

At step 1005 intelligent computing system can receive a plurality of best practice rules pertaining to best practices for interacting with the system.

At step 1010 intelligent computing system 200 can receive a first user interaction from a user.

At step 1015 intelligent computing system 200 can determine, by a best practice determiner 212, whether the first user interaction fits at least one of the best practice rules.

At step 1020, responsive to determining, by the best practice determiner 212, that the first user interaction does not fit the at least one of the best practice rules, intelligent computing system 200 can generate, using a processor, a modified user interaction by modifying the first user interaction based, at least in part, on the received plurality of best practice rules.

At step 1025 intelligent computing system 200 can present to the user the modified user interaction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Several definitions that apply throughout this document will now be presented.

As defined herein, the term "fit" means of a suitable quality, standard or type to meet a desired purpose.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, an in-vehicle infotainment system, a smart vehicle system, and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "user" means a person (i.e., a human being).

What is claimed is:

1. A method, comprising:

receiving a plurality of best practice rules pertaining to best practices for interacting with a system, wherein the system is a smart vehicle system in a vehicle;

receiving a first user interaction from a user, wherein the first user interaction is a user control of a steering system changing a steering angle, and wherein the first user interaction is detected using a steering sensor;

determining, by a best practice determiner, whether the first user interaction fits at least one of the best practice rules;

responsive to determining, by the best practice determiner, that the first user interaction does not fit the at least one of the best practice rules, generating, using a processor, a modified user interaction by modifying the first user interaction based, at least in part, on the received plurality of best practice rules; and presenting to the user the modified user interaction.

2. The method of claim 1, further comprising:

receiving a second user interaction from the user;

determining, by the best practice determiner, whether the second user interaction fits at least one of the best practice rules; and responsive to determining, by the best practice determiner, that the second user interaction fits the at least one of the best practice rules, storing the second user interaction as a sample interaction comprising training data.

3. The method of claim 1, further comprising:

identifying system documentation for at least one other system;

determining best practices for the at least one other system by the best practice determiner analyzing the system documentation for the at least one other system;

determining whether the best practices for the at least one other system fit the first user interaction by comparing the first user interaction to the best practices for the at least one other system;

responsive to determining that the best practices for the at least one other system fit the first user interaction, generating a rationale explaining why the best practices for the at least one other system fit the first user interaction; and presenting to the user the rationale explaining why the best practices for the at least one other system fit the first user interaction.

4. The method of claim 1, further comprising:

determining differences between the first user interaction and the best practice rules; and outputting the determined differences to best practice descriptions of best practices for the system.

5. The method of claim 1, further comprising:

responsive to the steering sensor detecting the first user interaction, determining, by the best practice determiner, whether an adaptive cruise control for the vehicle is enabled while the first user interaction is detected; and responsive to determining, by the best practice determiner, that the adaptive cruise control for the vehicle is enabled while the first user interaction is detected, determining, in real time based on the best practice rules, that best practice during use of the adaptive cruise control is for the user to keep control of steering system and for the vehicle not to drift into other lanes, wherein the modified user interaction comprises a suggestion pertaining to safe operation of the vehicle.

6. The method of claim 5, further comprising:

accessing, using a transceiver, best practices for at least one other smart vehicle system;

determining whether the best practices for the at least one other smart vehicle system fit the first user interaction by comparing the first user interaction to the best practices for at least one other smart vehicle system;

responsive to determining that the best practices for the at least one other smart vehicle system fit the first user interaction, generating a rationale explaining why the best practices for the at least one other smart vehicle system fit the first user interaction; and presenting to the user the rationale explaining why the best practices for the at least one other smart vehicle system fit the first user interaction.

7. The method of claim 1, wherein the best practice determiner comprises a large language model.

8. A system, comprising:

a processor programmed to initiate executable operations comprising:

receiving a plurality of best practice rules pertaining to best practices for interacting with the system;

receiving a first user interaction from a user;

determining, by a best practice determiner, whether the first user interaction fits at least one of the best practice rules;

responsive to determining, by the best practice determiner, that the first user interaction does not fit the at least one of the best practice rules, generating a modified user interaction by modifying the first user interaction based, at least in part, on the received plurality of best practice rules; presenting to the user the modified user interaction;

identifying system documentation for at least one other system;

determining best practices for the at least one other system by the best practice determiner analyzing the system documentation for the at least one other system;

determining whether the best practices for the at least one other system fit the first user interaction by comparing the first user interaction to the best practices for the at least one other system;

responsive to determining that the best practices for the at least one other system fit the first user interaction, generating a rationale explaining why the best practices for the at least one other system fit the first user interaction; and presenting to the user the rationale explaining why the best practices for the at least one other system fit the first user interaction.

9. The system of claim 8, the executable operations further comprising:

receiving a second user interaction from the user;

determining, by the best practice determiner, whether the second user interaction fits at least one of the best practice rules; and responsive to determining, by the best practice determiner, that the second user interaction fits the at least one of the best practice rules, storing the second user interaction as a sample interaction comprising training data.

10. The system of claim 8, the executable operations further comprising:

determining differences between the first user interaction and the best practice rules; and outputting the determined differences to best practice descriptions of best practices for the system.

11. The system of claim 8, wherein;

the system is a smart vehicle system in a vehicle;

the first user interaction from the user is a user control of a steering system changing a steering angle; and the executable operations further comprise detecting, using a steering sensor, the first user interaction.

12. The system of claim 11, the executable operations further comprising:

responsive to the steering sensor detecting the first user interaction, determining, by the best practice determiner, whether an adaptive cruise control for the vehicle is enabled while the first user interaction is detected; and responsive to determining, by the best practice determiner, that adaptive cruise control for the vehicle is enabled while the first user interaction is detected, determining, in real time based on the best practice rules, that best practice during use of the adaptive cruise control is for the user to keep control of steering system and for the vehicle not to drift into other lanes, wherein the modified user interaction comprises a suggestion pertaining to safe operation of the vehicle.

13. The system of claim 12, the executable operations further comprising:

accessing, using a transceiver, best practices for at least one other smart vehicle system;

determining whether the best practices for the at least one other smart vehicle system fit the first user interaction by comparing the first user interaction to the best practices for at least one other smart vehicle system;

responsive to determining that the best practices for the at least one other smart vehicle system fit the first user interaction, generating a rationale explaining why the best practices for the at least one other smart vehicle system fit the first user interaction; and presenting to the user the rationale explaining why the best practices for the at least one other smart vehicle system fit the first user interaction.

14. The system of claim 8, wherein the best practice determiner uses a transformer model architecture.

15. A computer program product, comprising:

one or more computer readable storage mediums having program code stored thereon, the program code stored on the one or more computer readable storage mediums collectively executable by a data processing system to initiate operations including:

receiving a plurality of best practice rules pertaining to best practices for interacting with a system, wherein the system is a smart vehicle system in a vehicle;

receiving a first user interaction from a user, wherein the first user interaction from the user is a user control of a steering system changing a steering angle, and wherein the first user interaction is detected using a steering sensor;

determining, by a best practice determiner, whether the first user interaction fits at least one of the best practice rules;

responsive to determining, by the best practice determiner, that the first user interaction does not fit the at least one of the best practice rules, generating a modified user interaction by modifying the first user interaction based, at least in part, on the received plurality of best practice rules; and presenting to the user the modified user interaction.

16. The computer program product of claim 15, wherein the program code is executable by the data processing system to initiate operations further comprising:

receiving a second user interaction from the user;

determining, by the best practice determiner, whether the second user interaction fits at least one of the best practice rules; and responsive to determining, by the best practice determiner, that the second user interaction fits the at least one of the best practice rules, storing the second user interaction as a sample interaction comprising training data.

17. The computer program product of claim 15, wherein the program code is executable by the data processing system to initiate operations further comprising:

identifying system documentation for at least one other system;

determining best practices for the at least one other system by the best practice determiner analyzing the system documentation for the at least one other system;

determining whether the best practices for the at least one other system fit the first user interaction by comparing the first user interaction to the best practices for the at least one other system;

responsive to determining that the best practices for the at least one other system fit the first user interaction, generating a rationale explaining why the best practices for the at least one other system fit the first user interaction; and presenting to the user the rationale explaining why the best practices for the at least one other system fit the first user interaction.

18. The computer program product of claim 15, wherein the program code is executable by the data processing system to initiate operations further comprising:

determining differences between the first user interaction and the best practice rules; and outputting the determined differences to best practice descriptions of best practices for the system.

19. The computer program product of claim 15, wherein the program code is executable by the data processing system to initiate operations further comprising:

responsive to the steering sensor detecting the first user interaction, determining, by the best practice determiner, whether an adaptive cruise control for the vehicle is enabled while the first user interaction is detected; and responsive to determining, by the best practice determiner, that adaptive cruise control for the vehicle is enabled while the first user interaction is detected, determining, in real time based on the best practice rules, that best practice during use of the adaptive cruise control is for the user to keep control of steering system and for the vehicle not to drift into other lanes, wherein the modified user interaction comprises a suggestion pertaining to safe operation of the vehicle.

20. The computer program product of claim 15, wherein the best practice determiner determines whether adaptive cruise control is enabled.

* * * * *